(12) United States Patent
Fujita (10) Patent No.: US 6,252,846 B1
(45) Date of Patent: Jun. 26, 2001

(54) AUTOMATIC SWITCHING SYSTEM (75) Inventor: Yoshitaka Fujita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/017,879

(22) Filed: Feb. 3, 1998

(30) Foreign Application Priority Data

Feb. 5, 1997 (JP) .................................................. 9-023054

(51) Int. Cl.$^7$ ....................................................... H04L 1/22
(52) U.S. Cl. ..................... 370/220; 370/228; 340/825.01
(58) Field of Search .................... 370/220, 221, 370/216, 217, 218, 219, 386, 387, 388, 395, 396, 400, 228, 225, 226; 340/824.01, 825.16; 395/182.05, 182.09, 182.11, 182.14, 181, 182.01, 182.02; 379/220, 279, 221, 273; 709/239; 714/11, 13

(56) References Cited

U.S. PATENT DOCUMENTS

| 5,343,464 | * | 8/1994 | Iino et al. ............................ 370/227 |
| 5,740,157 | * | 4/1998 | Demiray et al. ...................... 370/219 |
| 5,796,717 | * | 8/1998 | Shinbashi et al. .................... 370/216 |
| 5,936,938 | * | 8/1999 | Weldon et al. ....................... 370/228 |
| 5,999,983 | * | 12/1999 | Ichimi et al. ........................ 789/239 |

FOREIGN PATENT DOCUMENTS

| 49-111520 | 10/1974 | (JP) . |
| 49-111523 | 10/1974 | (JP) . |
| 58-225761 | 12/1983 | (JP) . |
| 60-001995 | 1/1985 | (JP) . |
| 63-039253 | 2/1988 | (JP) . |
| 63-222559 | 9/1988 | (JP) . |
| 63-276952 | 11/1988 | (JP) . |
| 5-244225 | 9/1993 | (JP) . |
| 8-097909 | 4/1996 | (JP) . |

* cited by examiner

Primary Examiner—Dang Ton
Assistant Examiner—Ken Vanderpuye
(74) Attorney, Agent, or Firm—Foley & Lardner (57) ABSTRACT An automatic switching system, in which the arrangement of apparatus can be simplified and a service can be continuously performed wherever and whenever any trouble occurs, is provided. The automatic switching system comprises a plurality of communication processing units including a transmission line selection part for selecting an arbitrary transmission line from a plurality of multiplexed transmission lines as a transmission line for transmitting information, a communication control part for connecting a predetermined communication apparatus through a transmission line selected by the transmission line selection part thereby to transmit information in accordance with a predetermined communication protocol, and information exchange part for exchanging information between these communication processing units.

11 Claims, 8 Drawing Sheets

AUTOMATIC SWITCHING SYSTEM

BACKGROUND OF THE INVENTION

1. Field of the Invention

The present invention relates to an automatic switching system forming a communication network as a switching node, and more specifically to the automatic switching system having a redundant system configuration in order to improve a reliability of the communication network.

2. Description of the Related Art

As an automatic switching system having a redundant system configuration in order to improve a reliability of the communication network, which is composed of a plurality of automatic switching systems as switching nodes and inter connected by transmission lines to each other, there are known ones such as disclosed in Japanese Patent Laid-open Nos. Sho 63-276952 and Hei 5-244225, for example as the conventional technology.

Figure 6:
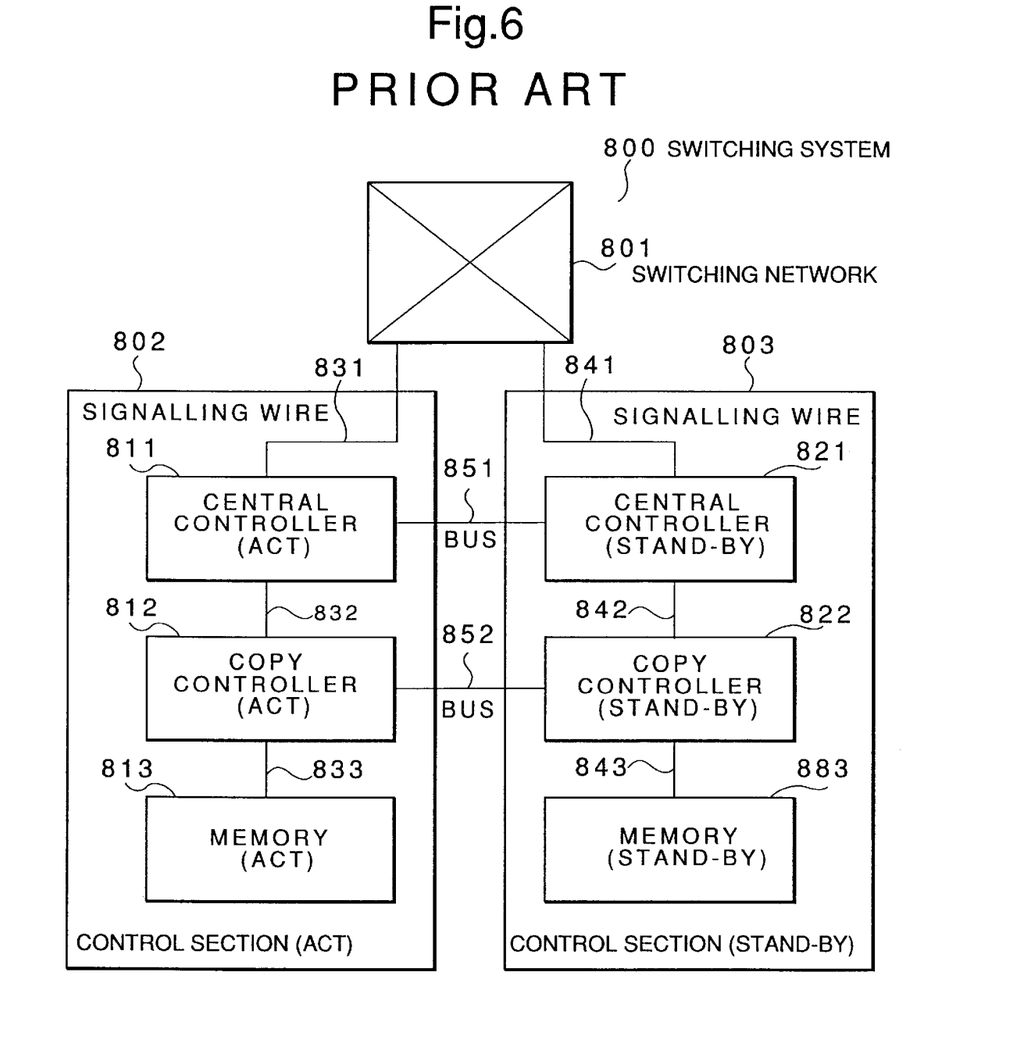
FIG. 6 is a block diagram schematically showing a switching system according to an example of the prior art.

FIG. 6 is a block diagram schematically showing a switching system disclosed in Japanese Patent Laid-open No. Sho 63-276952. As illustrated, a switching system 800 generally comprises a switching network 801, a current-system control section (ACT) 802 and an auxiliary-system control section (STAND-BY) 803.

The ACT system control section 802 comprises an ACT system central controller 811 connected to the switching network 801 through a signal line 831, an ACT copy controller 812 connected to the ACT system central controller 811 through a signal line 832 and an ACT memory 813 connected to the ACT copy controller 812 through a signal line 833. On the other hand, the STAND-BY system control section 803 comprises a STAND-BY central controller 821 connected to the switching network 801 through a signal line 841, a STAND-BY copy controller 822 connected to the STAND-BY central controller 821 through a signal line 842 and a STAND-BY memory 823 connected to the STAND-BY copy controller 822 through a signal line 843.

As described above, in this switching system 800, the switching network 801 is separated from the control sections 802, 803, and the control sections 802, 803 are forming a redundant configuration which provides a back up operation for each other in case of one section having a faulty condition. Then, a bus 851 is extended between the ACT central controller 811 and the STAND-BY central controller 821, and a bus 852 also is extended between the ACT copy controller 812 and the STAND-BY copy controller 822, whereby data to be written in the STAND-BY memory 823 is passing from the ACT central controller 811 through the bus 851, the STAND-BY central controller 821, the signal line 842, the STAND-BY copy controller 822 and the signal line 843 when a bus trouble occurs between the ACT copy control apparatus 812 and the STAND-BY copy controller 822, for example. Thus, there can be improved reliability against the bus trouble.

Figure 7:
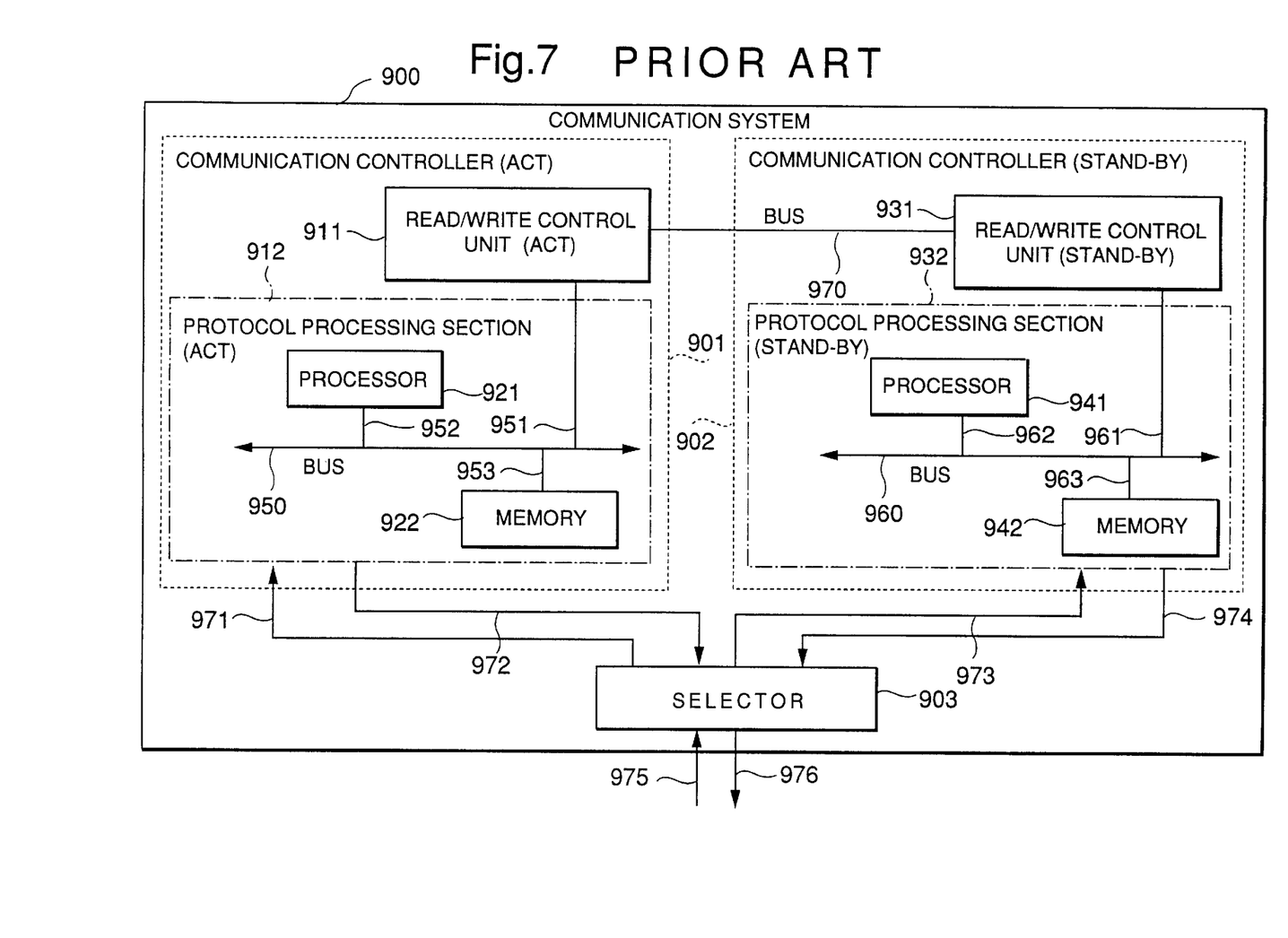
FIG. 7 is a block diagram schematically showing a communication system according to an example of the prior art.

FIG. 7 is a block diagram schematically showing a communication system disclosed in Japanese Patent Laid-open No. Hei 5-244225, and illustrates connection relationships of its internal processing blocks. As illustrated, a communication system 900 generally comprises a current-system communication controller (ACT) 901, an auxiliary-system communication controller (STAND-BY) 902 and a selector 903, in which the communication controllers 901, 902 for processing data communication control in accordance with a predetermined communication protocol are redundantly provided as the ACT system and the STAND-By system.

The ACT communication controller 901 comprises an ACT read/write control unit 911 and an ACT protocol processing section 912 connected to the ACT read/write control unit 911 through a signal line 951. Further, the ACT protocol processing section 912 comprises a processor 921 connected to a bus 950 through a signal line 952 and a memory 923 connected to the bus 950 through a signal line 953. Similarly, the STAND-BY communication controller 902 comprises a STAND-BY read/write control unit 931 and a STAND-BY protocol processing unit 932 connected to the STAND-BY read/write control UNIT 931 through a signal line 961. Further, the STAND-BY protocol processing section 932 comprises a processor 941 connected to a bus 960 through a signal line 962 and a memory 942 connected to the bus 960 through a signal line 963. Then, the ACT read/write control unit 911 and the STAND-BY read/write control unit 931 are connected to each other by means of a state information transfer bus 970.

The ACT read/write control unit 911 reads out state information of layer 2, which is necessary to the minimum to continue a layer 2 (data link layer) processing, from a memory 922 provided in the ACT protocol processing section 912 through the signal line 951, the bus 950 and the signal line 953, and transfers this state information of layer 2 from a state information transfer bus 970 to the STAND-BY read/write control unit 931. The STAND-BY read/write control unit 931 writes the state information of layer 2 transferred through the state information transfer bus 970 in a memory 942 provided in the STAND-BY protocol processing unit 932 through the signal line 961, the bus 960 and the signal line 963.

The ACT communication protocol processing section 912 and the STAND-BY communication protocol processing section 932 are adapted to carry out a data communication control in accordance with a procedure of an HDLC (High level Data Link Control Procedure) as an example of a communication protocol. The selector 903 selects any one set of a reception line 971 and a transmission line 972 of the ACT communication controller 901 and a reception line 973 and a transmission line 974 of the STAND-BY communication controller 902, and connects the selected set to an external reception line 975 and an external transmission line 976.

Figure 8:
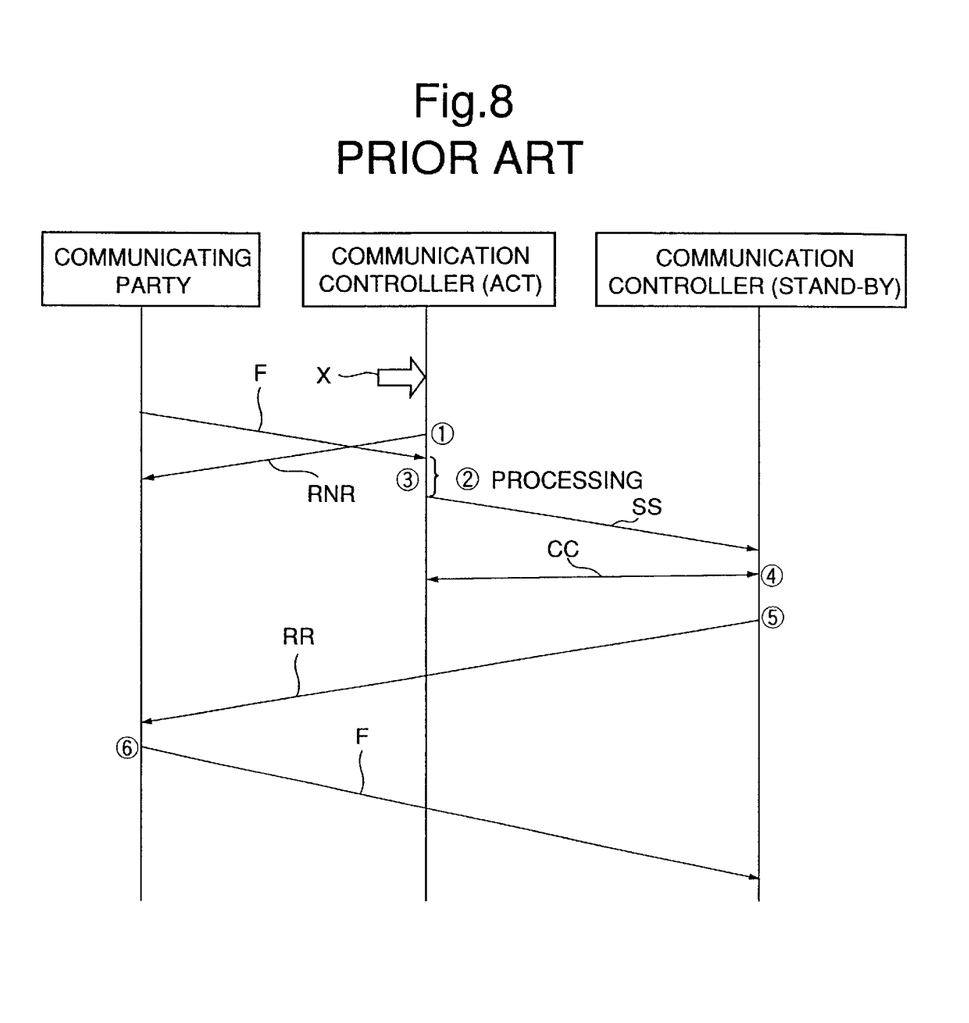
FIG. 8 is a diagram used to explain the procedure in which the communication system shown in FIG. 7 is operated.

FIG. 8 is a diagram used to explain the procedure in which the communication system 900 is operated, and illustrates a processing procedure executed when the redundant system (ACT and STAND-BY) is switched over in response to a command entered by an operator or the like. Assuming that there occurs a system switching factor at a timing shown by an open arrow X in the figure, then the ACT communication controller 901, which has so far received a frame signal F from a communicated party, transmits a communication restriction frame signal RNR instructing a pause of a frame transmission to the communicated party, thereby controlling a data transmission of the communicated party (see ① in FIG. 8).

Subsequently, the communication system executes a reception processing of the frame signal F which has been so far transmitted until the communicated party receives the frame signal RNR (see ② in FIG. 8). Then, the ACT read/write control unit 911 transmits state information SS read out from the memory 922 to the STAND-BY read/write control unit 931 (see ③ in FIG. 8). After that, the STAND-BY read/write control unit 931 writes the received state information SS in the memory 942. Thus, the protocol processing states in the ACT protocol processing section 912 and the STAND-BY protocol processing section 932 become equivalent so that the STAND-BY protocol processing section 932 becomes able to continue the layer 2 processing.

Then, by exchanging a control signal CC between the ACT system and the STAND-BY system, the system is switched over (see ④ in FIG. 8), and a communication is resumed by using the STAND-BY communication controller 902 as a new ACT communication controller. Specifically, the STAND-BY communication controller 902, which became the new ACT communication controller, transmits a communication restriction releasing frame signal RR for instructing a resumption of a frame transmission to the communicated party (see ⑤ in FIG. 8), and receives the frame signal F continuously transmitted from the communicated party, thereby resuming a communication (see ⑥ in FIG. 8).

However, in the switching system shown in FIG. 6, since the switching network 801 is a single configuration, and not made redundant, there is then the problem that a trouble brought about by the switching network 801 itself will affect service to the communication network users. Furthermore, in this switching system 800, even though the switching network 801 is made redundant, the redundant switching network 801 and the control sections 802, 803 for controlling the redundant network are separated from each other with the result that the ACT system and the STAND-BY system are switched separately. Then, the interface and the protocol exchange between the ACT system and the STAND-BY system become complicated. There is then presented a new problem that a scale of the system becomes large in size.

Moreover, in the communication system shown in FIG. 7, when the system is switched over from the ACT communication controller 901 to the STAND-BY communication controller 902, the protocol processing states in the ACT protocol processing section 912 and the STAND-BY protocol processing section 932 are made equivalent by transferring the state information SS stored in the memory 922 within the ACT protocol processing section 912 to the memory 942 within the STAND-BY protocol processing section 942. There are then presented the following problems.

Specifically, when a sudden trouble occurs relative to the ACT system, there is then the possibility that even data containing connection information with a communicated party or the like will be lost. If so, then state information must be frequently exchanged between the ACT communication controller 901 and the STAND-BY communication controller 902. There is then the risk that a service interruption such as a line disconnection will occur inevitably.

SUMMARY OF THE INVENTION

In order to solve the above-mentioned problems, a first object of the present invention is to provide an automatic switching system in which arrangements of apparatus can be simplified. A second object of the present invention is to provide an automatic switching system in which a service can be made continuously regardless of the occurrence of a trouble.

An automatic switching system according to the present invention comprises a plurality of communication processing units which includes a transmission line selection part for selecting an arbitrary transmission line from a plurality of transmission lines as a transmission line for transmitting information, and a communication control part for establishing a connection for a communication apparatus with respect to a requested communication through the transmission line selected by the transmission line selection part thereby to transmit information in accordance with a predetermined communication protocol, and an information transmission part for exchanging information between these communication processing units.

That is, the arrangement of the apparatus can be simplified by integrating the transmission line selection part and the communication control part.

The communication processing unit and the transmission lines can be duplicated as the ACT system and the STAND-BY system, and each communication processing unit includes a transmission line selection part for selecting any one of duplexed ACT and STAND-BY transmission lines as a transmission line for transmitting information, and a communication control part for establishing a connection for a communication apparatus with respect to a requested communication through the transmission line selected by the transmission line selection part thereby to transmit information in accordance with a predetermined communication protocol, and an information transmission part for exchanging information between the ACT communication processing unit and the STAND-BY communication processing unit.

The communication control part further includes an ATM (Asynchronous Transmission Mode) switching network and a protocol controller for establishing a connection for a communication apparatus with respect to a requested communication through the transmission line selected by the transmission line selection part thereby to transmit information in accordance with a predetermined communication protocol, and the information transmission part transfers the connection information, which has been established in the ACT communication processing unit, to the STAND-BY communication processing unit.

In more detail, the communication control part includes an ATM (Asynchronous Transmission Mode) switching network for a connection path, a call processing executing circuit for executing a predetermined processing for a requested call originated by a communication apparatus connected through the transmission line, a protocol stack having a predetermined communication protocol, a memory for memorizing connection path setting information and a communication interface circuit for connecting a communication control part within other communication processing unit, and main portion of the information trans mission part is an information transmission path which is connecting each of the communication interface circuits in the communication control parts of the ACT system and the STAND-BY system for transmitting connection path setting information which has been memorized in the memory of the ACT system to the memory of the STAND-BY system.

The c all processing executing circuit in the communication control parts of the STAND-BY system does not execute the processing for the requested call originated by a communication apparatus connected through the transmission line until receiving connection path setting information from the ACT system through the information transmission path, and the call processing executing circuit in the communication control parts of the STAND-BY system executes the processing for the requested call or iginated by a communication apparatus by using connection path setting information transmitted from the ACT system.

In other words, the call processing executing circuit in the communication control parts of the ACT system transfers the connection path setting information for the requested call to the STAND-BY system when the connection path setting in the ACT system has been completed.

As for another embodiment of the present invention, an automatic switching system comprises at least two ACT communication processing units each having the same arrangement as the foregoing unit, a STAND-BY communication processing unit which is connected to the at least two ACT communication processing units by each of the selected transmission lines and including a communication control part for establishing a connection, and a selector for selecting one of transmission lines connected to the ACT communication processing units, and an information transmission path connecting each ACT communication processing unit to the selector of the STAND-BY communication processing unit for exchanging information between one of the ACT communication processing units and the STAND-BY communication processing unit.

In this embodiment, the communication control part of the STAND-BY communication processing unit further includes a plurality of memories for memorizing the respective connection information of each ACT communication processing unit, and each ACT communication processing unit transfers the connection information for the requested call to the STAND-BY communication processing unit when the connection path setting in each ACT communication processing unit has been completed. In the STAND-BY communication processing unit, connection information of each ACT communication processing unit is memorized in the respective memories, and the connection information corresponding to an ACT communication processing unit to be switched over is copied to the ATM switching network when a switching over instruction is received.

DETAILED DESCRIPTION OF THE PREFERRED EMBODIMENTS

An embodiment of the present invention will be described in detail with reference to the accompanying drawings.

Figure 1:
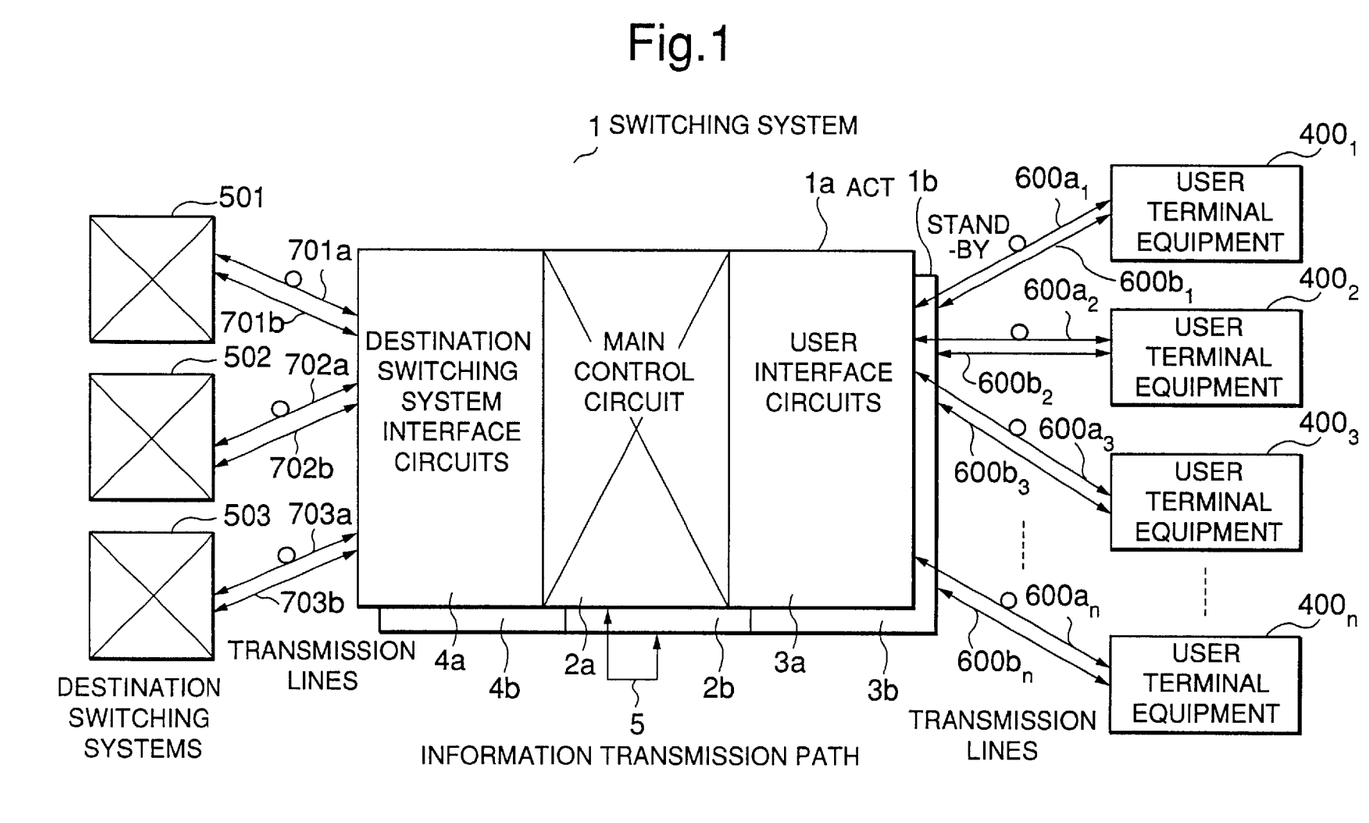
FIG. 1 is a block diagram showing a communication network including an automatic switching system according to the present invention.

FIG. 1 is a block diagram showing a communication network including an automatic switching system according to the present invention, and illustrates the manner that the automatic switching system is provided between a plurality of user terminal equipment made of an STB (Set Top Box) and destination switching systems for delivering data to a final destination. As shown, the automatic switching system 1 is connected to n (n is an integer greater than 2) user terminal equipment $400_1$ to $400_n$ through duplicated transmission lines made of an optical fiber, a metallic cable or the like, e.g. transmission lines $600a_1$, to $600a_n$, $600b_1$ to $600b_n$ and is connected through transmission lines 701a to 703a, 701b to 703b to three destination switching systems 501 to 503, respectively.

The automatic switching system 1 is of the duplicated system arrangement of an ACT system 1a and a STAND-BY system 1b. The systems 1a and 1b include main control circuits (communication processing means) 2a, 2b in which a switching network and a control block are integrated, user interface circuits (communication interfaces) 3a, 3b for the connection to the user terminal equipment $400_1$ to $400_n$ and destination switching system interface circuits (communication interfaces) 4a, 4b for the connection to destination switching systems 501 to 503. Then, there is provided an information transmission path (information exchange means) 5 for executing the data communication between the main control circuits 2a, 2b.

Figure 2:
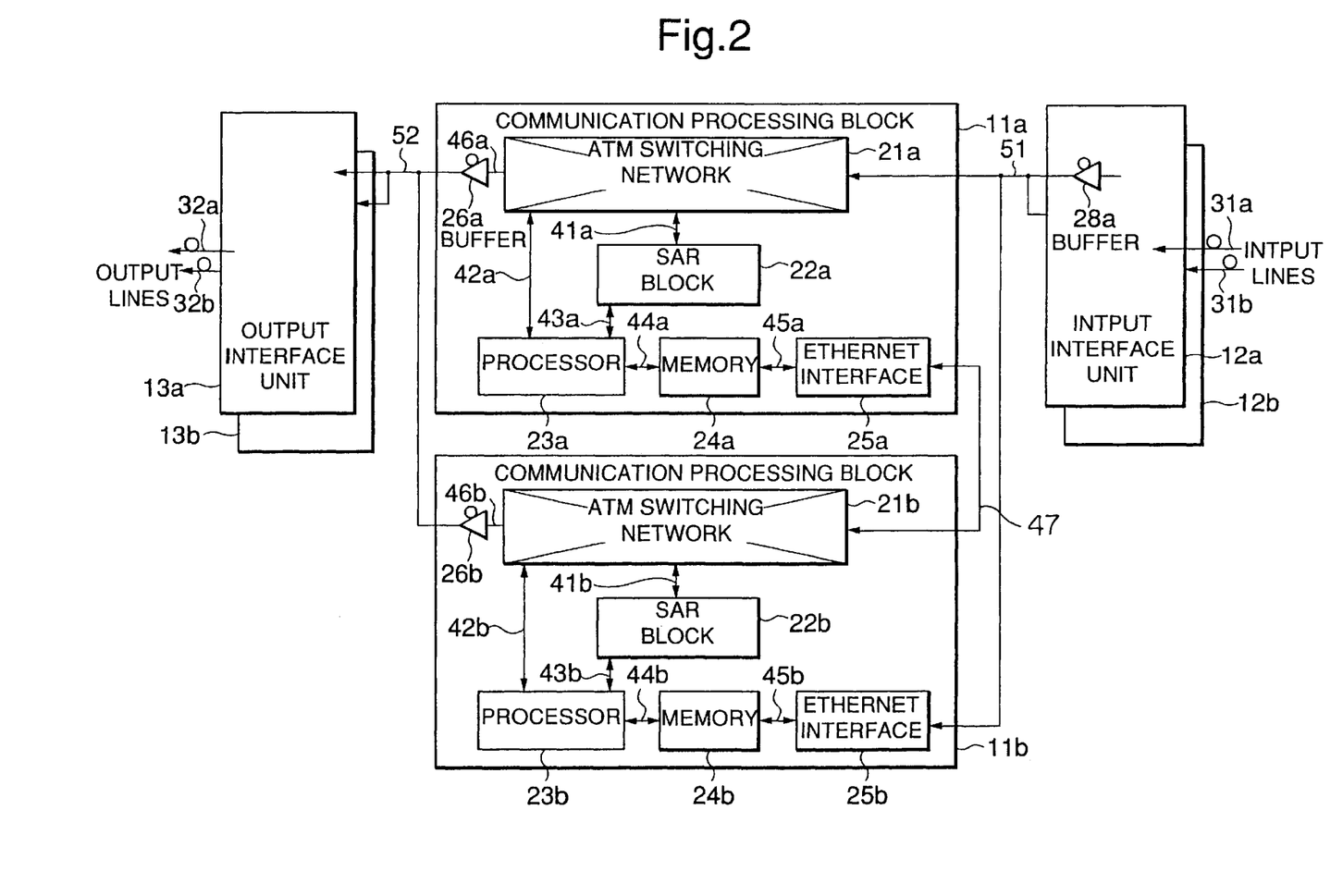
FIG. 2 is a block diagram showing a main portion of the automatic switching system according to the present invention.

FIG. 2 is a block diagram showing a main portion of the automatic switching system. As illustrated, the automatic switching system 1 generally comprises communication processing blocks 11a, 11b, input interface units 12a, 12b and output interface units 13a, 13b. There are two sets of the communication processing blocks 11a, 11b, the input interface units 12a, 12b and the output interface units 13a, 13b which are the duplicated as the ACT system and the STAND-BY system.

Each of the ACT and STAND-BY communication processing blocks 11a, 11b includes one package composed of ATM (Asynchronous Transfer Mode) switching networks 21a, 21b, SAR (Segmentation And Reassemble) blocks 22a, 22b, processors 23a, 23b, memories 24a, 24b, Ethernet interfaces 25a, 25b and tri-state buffers 26a, 26b.

The ATM switching networks 21a, 21b are adapted to execute a circuit switching at the unit of ATM cell. When a call request signal is received from the user side (input line side), for example, the signal is output through signal lines 41a, 41b to the SAR blocks 22a, 22b. (Input and output signals between the switching system and the user will hereinafter be collectively referred to as "signaling signals".)

The SAR blocks 22a, 22b reassemble cells for signaling signals inputted from the ATM switching networks 21a, 21b through the signal lines 41a, 41b based on an ATM adaptation layer 5 (AAL5) standardized in the ITU-T recommendation (I. 363), and output the reassembled signals through signal lines 43a, 43b to the processors 23a, 23b. Also, these blocks assemble cells (segmentation) for signaling signals inputted from the processors 23a, 23b through the signal lines 41a, 41b, and output the assembled cells through the signal lines 43a, 43b to the ATM switching networks 21a, 21b.

The processors 23a, 23b execute a predetermined processing based on signals inputted from the SAR blocks 22a, 22b through the signal lines 43a, 43b, and output signaling signals to the SAR blocks 22a, 22b of the user through the signal lines 43a, 43b. Also, the processors set user data channels (input and output channels relative to the automatic switching system 1) in the ATM switching networks 21a, 21b through the signal lines 42a, 42b. The memories 24a, 24b are adapted to store setting information of a user data channel inputted from the processors 23a, 23b through the signal lines 44a, 44b, and the stored setting information can be read and written by the Ethernet interfaces 25a, 25b through the signal lines 45a, 45b.

The Ethernet interfaces 25a, 25b are Ethernet interfaces standardized by the IEEE802.3. The ACT system Ethernet interface 25a and the STAND-BY system Ethernet interface 25b are connected with each other through the signal line 47, thereby to exchange data therebetween. Thus, exactly the same content as the setting information memorized in the memory 24a is memorized in the memory 24b.

The tri-state buffers 26a, 26b are adapted to place their operation states into the enable states or the disable states based on a switching control signal inputted from the outside. When the tri-state buffer 26a is set in the enable state, the tri-state buffer 26b is placed in the disable state. On the other hand, when the tri-state buffer 26a is set in the disable state, the tri-state buffer 26b is placed in the enable state. Incidentally, in the communication processing block 11a, 11b having the tri-state buffer which is placed in the disable state, the processor does not answer the call connection request from the SAR block.

The ACT and STAND-BY input interface units 12a, 12b are adapted to transmit signals inputted from external input lines 31a, 31b to the ATM switching networks 21a, 21b through the tri-state buffers 28a, 28b and the signal line 51. As an input signal in this case, there can be considered an STM-1 signal which is standardized by the ITU-T recommendation (G. 707, 708, 709). This STM-1 signal is of the duplicated signals, and the duplicated signals are respectively inputted to the ACT or STAND-BY communication processing blocks 11a, 11b. The ACT and STAND-BY output interface units 13a, 13b are adapted to output signals outputted from the tri-state buffers 26a, 26b through the signal line 52 to the external output lines 32a, 32b as the STM-1 signal.

Figure 3:
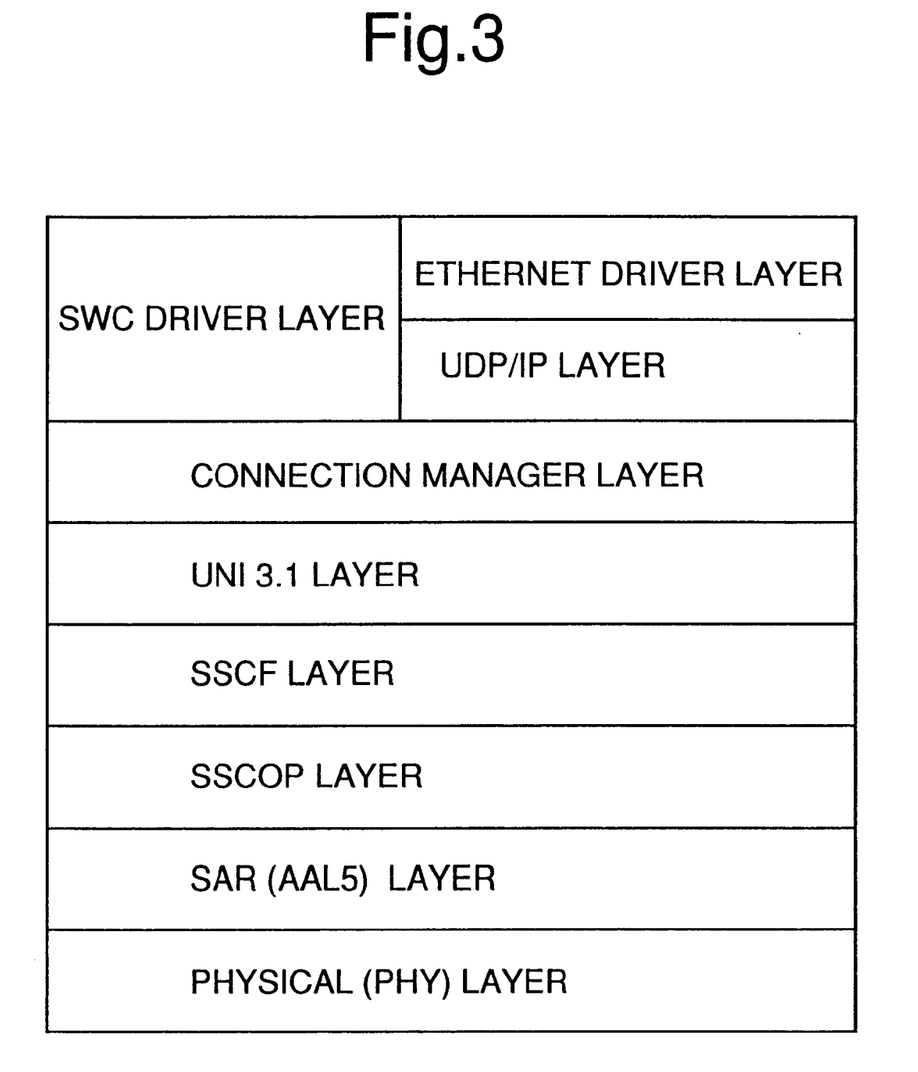
FIG. 3 is a diagram showing an example of a protocol stack used in a communication processing block of the automatic switching system according to the present invention.

FIG. 3 shows an example of a protocol stack used in a communication processing block. As illustrated, a physical layer (PHY) is adapted to process an overhead portion including a pointer processing other than an ATM cell of the STM-1 signal standardized by the ITU-T recommendation (G. 707, 708, 709), and this processing is executed at the communication processing blocks 11a, 11b. Although an SAR (AAL5) layer converts the signaling signals from the user terminal equipment $400_1$ to $400_n$, the destination switching systems 501 to 503 into the cell of the AAL5 and mapping to the ATM-1 signal, the signaling signals converted into the cell of the AAL5 are outputted through the ATM switching networks 21a, 21b to one port (SAR blocks 22a, 22b). Accordingly, as the processing of the SAR (AAL5) layer, the signaling signals of the cell form are reassembled into original packet form signals so that the processors 23a, 23b may understand the signaling signals, or the reverse processing (assembling the cells from the packet form signals) is carried out.

An SSCOP (service specific connection protocol) layer handles the signaling signal defined in the ITU-T recommendation Q. 2110. As communicated parties, the user terminal equipment $400_1$ to $400_n$ or the destination switching systems 501 to 503 have similar SSCOP layers. This layer exchanges a protocol between it and the SSCOP layer of the communicated party side, and this processing is executed by the processors 23a, 23b. An SSCF (Service Specific Coordination Function) layer is defined by the ITU-T recommendation Q. 2130 and is placed at a high-order layer of the SSCOP layer. The user terminal equipment $400_1$ to $400_n$ or the destination switching system 501 to 503 have a similar SSCF layer to exchange a protocol between it and the SSCF layer of the communicated party side. This processing is executed by the processors 23a, 23b.

An UNI3.1 layer is defined by the ATM form recommendation UNI3.1, and positioned at a high-order layer of the SSCF layer. This layer includes a message which mainly administers a call setting, i.e. signaling signal, such as a Call Proceeding message (hereinafter referred to as CP message) indicative of a connection request to the network from the user terminal equipment $400_1$ to $400_n$, a Connect message (hereinafter referred to as C message) which indicates that the request is received at the switching system and the call connection is performed within the ATM switching networks 21a, 21b, a Connect Acknowledge message (hereinafter referred to as CnACK message) which indicates the recognition of the reception of the C message from the terminal and a Release message (hereinafter referred to as R message) which indicates the disconnection of a call.

A connection manager layer determines (hereinafter referred to as CAC: Connection Admission Control) whether connection is to be performed or not for a Set up message (hereinafter referred to as S message) from the UNI3.1 layer, transmits or receives a message similar to the message from the user terminal equipment $400_1$ to $400_n$ to or from the ATM switching networks 21a, 21b of the destination switching system, and outputs an message for connecting a SWC (SWitch Control) driver which is an actual control driver of the ATM switching networks 21a, 21b when the connection is determined. Then, when the connection by the ACT ATM switching network 21a is determined, its connection information is sent through a UDP/IP layer and an Ethernet driver layer to the STAND-BY ATM switching network 21b in order to back-up the connection information by the STAND-BY ATM switching network 21b.

The UDP/IP layer is a protocol for realizing a transport service standardized by the IEEE802.3., and transmits and receives data between itself and the Ethernet driver layer by mapping or de-mapping a message from a connection manager layer to or from a frame format in accordance with the present protocol. The Ethernet driver layer is a driver layer for controlling the respective hardware devices of the ACT Ethernet interface 25a and STAND-BY Ethernet interface 25b which are connected by an Ethernet interface standardized by the IEEE802.3. The Ethernet driver layer is a layer which transmits data from the UDP/IP layer through the device of the Ethernet or the Ethernet to the STAND-BY Ethernet interface 25b or vice versa.

The SWC driver layer is a driver layer for directly controlling the ATM switching networks 21a, 21b and positioned above the connection manager layer. When receiving a call connection request message or a disconnect request message, this driver layer connects or disconnects paths in the ATM switching networks 21a, 21b.

An example of the operation of the automatic switching system according to the present invention will be described next.

Figure 4:
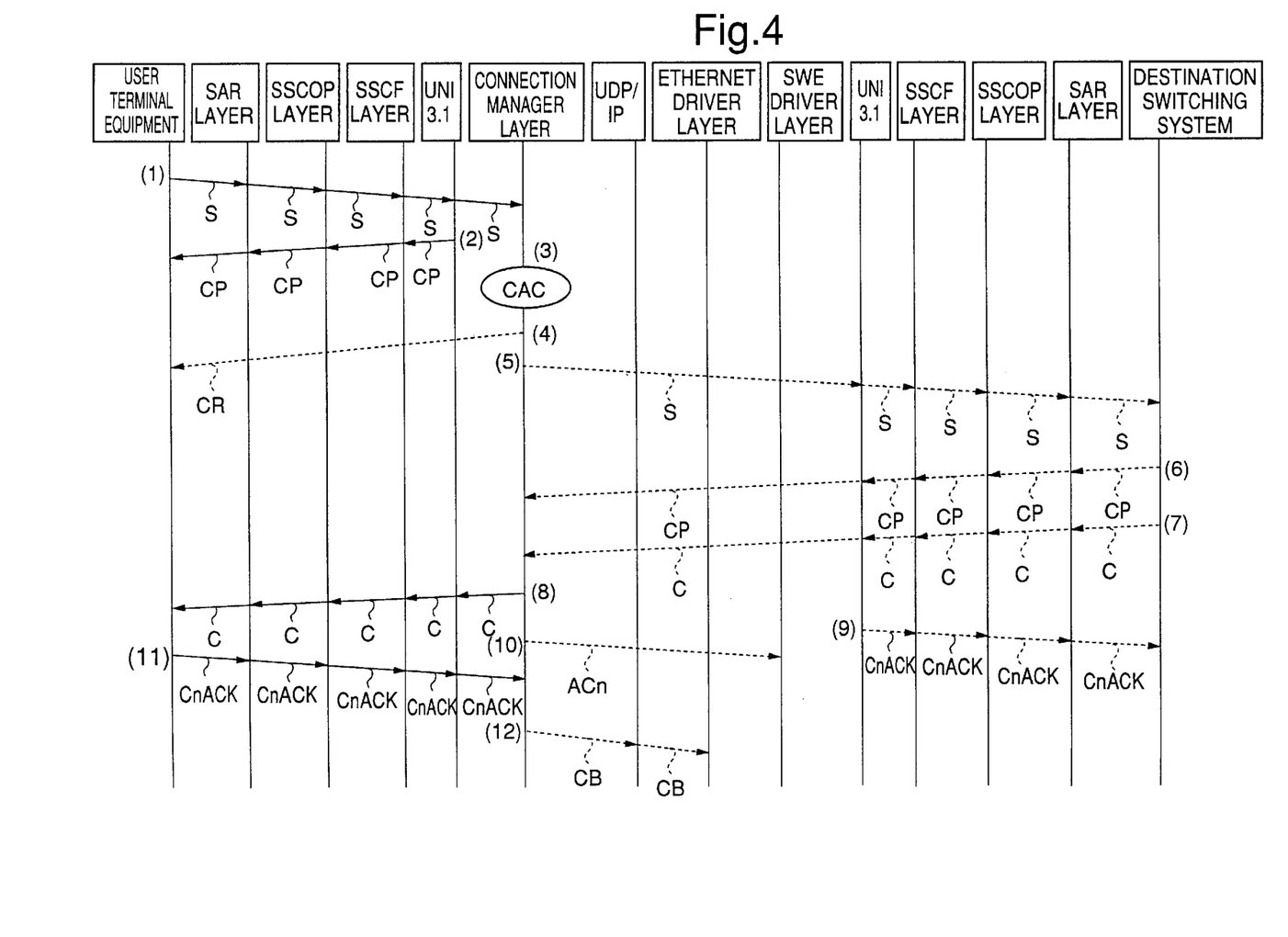
FIG. 4 is a diagram showing the manner in which a protocol is exchanged between the automatic switching system according to the present invention and the user terminal equipment and between the automatic switching system according to the present invention and the destination switching system.

FIG. 4 is a diagram showing the manner in which protocols are exchanged between the automatic switching system and the user terminal equipment according to the present invention, and between the automatic switching system and the destination switching system. In this sheet of drawing, reference numerals (1) to (12) attached to respective messages indicate the order in which the messages are processed.

The user terminal equipment $400_1$ to $400_n$ output an S message to the ACT communication processing block 11a as a request signal in order to connect their own user channels to the communication network. Then, the protocol stack shown in FIG. 3, i.e. the S message inputted to the physical layer as the STM-1 signal is transmitted to the connection manager layer through the physical→layer the SAR layer→the SSCOP layer→the SSCF layer→the UNI3.1 layer (see (1) in FIG. 4). Then, the communication processing block 11a returns the CP message indicating that the call is being processed to the user terminal equipment $400_1$ to $400_n$ (see (2) in FIG. 4).

Also, the connection manager layer processes the S message by executing the CAC, and determines whether or not the user terminal equipment should be connected to the ATM switching network of the destination switching systems 501 to 503 (see (3) in FIG. 4). As information for a judgment at that time, there may be used a call originated by an authorized user (a subscriber of the communication network), an observance of a limited band or a call origination of subscribed contents. Then, if it is determined that the user terminal equipment should not be connected as the result of the CAC execution, then the connection manager layer returns the CR message to the user terminal equipment $400_1$ to $400_n$ (see (4) in FIG. 4).

On the other hand, if it is determined that the user terminal equipment should be connected as the result of the CAC execution, then the connection manager layer outputs the S message to the destination switching systems 501 to 503 (see (5) in FIG. 4). Then, during the S message is processed by the destination switching system, the destination switching systems 501 to 503 output the CP message to the communication processing block hla, and this CP message is transmitted through the SAR layer→the SSCOP layer→the SSCF layer→the UNI3.1 layer to the connection manager layer (see (6) in FIG. 4).

Also, when receiving the S message correctly by the destination switching system, the destination switching systems 501 to 503 output a connect message (hereinafter referred to as C message) to the communication processing block 11a, and this C message is transmitted through the SAR layer→the SSCOP layer→the SSCF layer→the UNI3.1 layer to the connection manager layer (see (7) in FIG. 4).

Having received the C message, the connection manager layer outputs the C message, indicating that a call message from the user terminal equipment $400_1$ to $400_n$ n has been received at the called party side, to the user terminal equipment $400_1$ to $400_n$ (see (8) in FIG. 4), and returns the CnACK message, indicative of the recognition of the connection, from the UNI3.1 layer to the destination switching systems 501 to 503 (see (9) in FIG. 4). Further, the connection manager layer outputs an Add Connect message (hereinafter referred to as ACn message) to the SWC driver layer in such a manner that this connection is newly set to the ATM switching network 21a (see (10) in FIG. 4).

When receiving the C message from the connection manager layer, the user terminal equipment $400_1$ to $400_n$ return the Connect ACK message indicative of the recognition of the connection in the automatic switching system to the connection manager layer (see (11) in FIG. 4). Then, having received this CnACK message, the connection manager layer outputs a Connect Backup message (hereinafter referred to as CnB message) to the Ethernet driver layer in order that the same connection as that on the ACT side system may be effected on the ATM switching network 21b in the STAND-BY communication processing block lib (see (12) in FIG. 4).

Then, in the STAND-BY communication processing block 11b, based on the Cnb message sent from the Ethernet driver layer, the connection manager layer transmits connection information to the SWC driver layer in order to back-up the connection, and a connection similar to that of the ACT ATM switching network 21a is effected by the STAND-BY ATM switching network 21b.

As described above, in the STAND-BY communication processing block 11b, although the processor 23b receives the same message information as the message information exchanged between the user terminal equipment $400_1$ to $400_n$ and the destination switching systems 501 to 503 from the SAR layer similarly to the processor 23a of the ACT communication processing block 11a, this processor does not carry out any operation based on the information. Specifically, the STAND-BY communication processing block 11b maintains the same call setting as that of the ACT ATM switch network 21a in the ATM switch network 21b based on the information transmitted from the Ethernet driver layer in such a manner that a call may not be disconnected whenever the STAND-BY side system is switched over to the ACT side system.

Then, when the operating state of the system is changed from the STAND-BY side system to the ACT side system, the STAND-BY communication block continues the protocol processing as a new ACT system for the call connection that has been carried out by the original ACT system and performs the same operation as that of the original ACT communication processing block 11a. Thus, the STAND-BY communication block is constantly placed in the operable stand-by state so that the service to the user may not be interrupted.

As described above, according to the present invention, when the user terminal equipment $400_1$ to $400_n$ originate an outgoing call in order for user channels to be established, the signaling signals are transferred through the user circuit interfaces 3a, 3b of the automatic switching system 1 to the main control units 2a, 2b, and the main control units 2a, 2b execute the signaling signal processing and establish a connection for the call in the switch portion. Moreover, the signaling signal is transmitted to a desired destination switching system via the interface unit and the transmission line.

The ATM switching networks 21a, 21b, the SAR blocks 22a, 22b, the processors 23a, 23b which become the main control portions thereof, etc. are integrated in the main control units 2a, 2b, and are further redundantly provided in the ACT system and the STAND-BY system. Therefore, in the respective systems, the call settings have to be synchronized. To this end, the main control unit 2b of the STAND-BY system does not process the signaling signals transmitted from the user terminal equipment $400_1$ to $400_n$ and carries out a call setting similar to that of the ACT system in the STAND-BY ATM switching network 21b based on information transmitted from the ACT main control unit 2a through the transmission line 5.

As a consequence, the same state can be maintained between the ACT system and the STAND-BY system by exchanging data of state information relative to the ATM switching networks 21a, 21b, such as a call setting or release from the user, at a high speed between the two systems.

Moreover, since the switching unit and its control unit are formed integrally, even when the system changing over for a scheduled maintenance according to the operator's instruction occurs or an unexpected changing over due to an abrupt trouble occurs, the call setting state is maintained between the two systems so that the ACT system can be switched to the STAND-BY system without interrupting the service.

Figure 5:
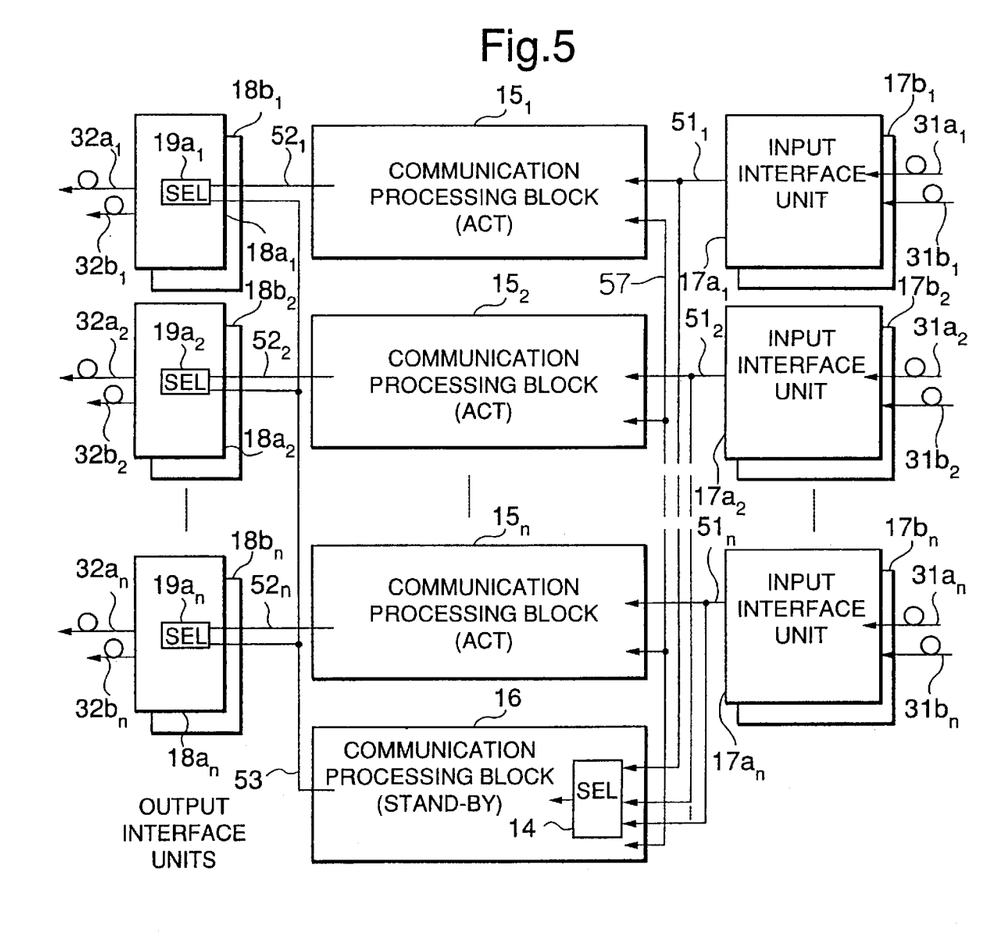
FIG. 5 is a block diagram showing a main portion of an automatic switching system according to a second embodiment of the present invention.

FIG. 5 is a block diagram showing a main portion of an automatic switching system according to a second embodiment of the present invention. Incidentally, in this sheet of drawing, elements and parts identical to those of the embodiment shown in FIG. 2 are marked with the same references.

While the ACT communication processing block $11a$ and the STAND-BY communication processing block $11b$ are provided in a one-to-one relation in the embodiment shown in FIG. 2, the present embodiment includes n (n is an integer greater than 2) ACT communication processing blocks $15_1$ to $15_n$ and one STAND-BY communication processing block 16. Moreover, in accordance with the number of the ACT communication processing blocks $15_1$ to $15_n$, there are provided input interface units $17a_1$ to $17b_n$ and output interface units $18a_1$ to $18b_n$. Incidentally, functions of the respective ACT communication processing blocks $15_1$ to $15_n$ are substantially the same as the function of the communication processing block $11a$. Moreover, the functions of the respective input interface units $17a_1$ to $17b_n$ also are substantially the same as those of the input interface units $12a$, $12b$.

Also, the STAND-BY communication processing block 16 includes a selector 14 and selects any one of signal lines $51_1$ to $51_n$ as a signal line to be inputted by means of this selector 14. Moreover, the STAND-BY communication processing block 16 is connected to the respective ACT communication processing blocks $15_1$ to $15_n$ through a signal line 57 and a memory within the STAND-BY communication processing block 16 includes an independent memory storage area for storing information transmitted from this signal line 57 and which is memorized at every communication processing blocks $15_1$ to $15_n$.

According to the above-mentioned arrangement, a call connection requests from the user terminal equipment $400_1$ to $400_n$, i.e. signaling signals are inputted to the respective redundant ACT communication processing blocks $15_1$ to $15_n$, and processed by the corresponding n ACT communication processing blocks $15_1$ to $15_n$. Contents of a specific message in that case and its protocol processing become similar to those of the aforementioned embodiment. Then, signals outputted from the input interface units $17a_1$ to $17b_n$ through the signal lines $51_1$ to $51_n$ are outputted to the corresponding ACT communication processing block and STAND-BY communication processing block 16.

In each of the ACT communication processing blocks $15_1$ to $15_n$, when receiving outgoing calls from the user terminal equipment $400_1$ to $400_n$, the connection manager layer establishes the connection of the outgoing calls in the ATM switching networks $21_1$ to $21_n$. Thereafter, having received the CnACK message from the user terminal equipment $400_1$ to $400_n$, the connection manager layer outputs the CnB message to the Ethernet driver layer in order that the connection state may be backed-up in the STAND-BY communication processing block 16. Here, since the Ethernet interface standardized in the IEEE802.3 includes a protocol stack (included in the Ethernet driver layer) such as collision control of packet data or the like, its output can be connected in a multiple-connection fashion shown by the signal line 57 in FIG. 5.

In the STAND-BY communication processing block 16, connection information of every call transmitted from the respective ACT communication processing blocks $15_1$ to $15_n$ to the ATM switching network $21b$ is processed by the processing such as the collision control and stored in independent memory storage areas at every n ACT communication processing blocks $15_1$ to $15_n$ in good order. Then, when arbitrary one of the n ACT communication processing blocks $15_1$ to $15_n$ has to be switched to the STAND-BY communication processing block 16, in the STAND-BY communication processing block 16, connection information within one of the ACT communication processing blocks $15_1$ to $15_n$ to be switched is copied to the ATM switching network $21b$.

Next, the selector 14 selects signal information from the corresponding input interface units $17a_1$ to $17b_n$. Moreover, in the corresponding output interface units $18a_1$ to $18b_n$, information outputted from the STAND-BY communication processing block 16 is selected by internal selectors $19a_1$ to $19a_n$, and then outputted from external output lines $32a_1$ to $32b_n$, thereby resulting in the system switching over being completed. At that time, the operation content (protocol stack processing) of the STAND-BY communication processing block 16 is exactly the same as those of the original ACT communication processing blocks $15_1$ to $15_n$ so that the respective user terminal equipment $400_1$ to $400_n$ can be perfectly protected from a bad influence. Furthermore, since a similar processing in the original STAND-BY communication processing block 16 is executed in the original ACT communication processing blocks $15_1$ to $15_n$, the original state can be recovered with ease.

As described above, according to this embodiment, since the switching network portion which executes the signal processing in actual practice and its control portion are provided redundantly and also integrated, the interface between the ACT system and the STAND-BY system and the protocol processing for the switching control can be simplified, and the system can be made highly reliable and reduced in scale. Moreover, since an outgoing call from each user terminal equipment is backed up by the processing at every call and the circuit in the STAND-BY communication processing block can be set at a high speed and in a real-time fashion, whenever a necessity of system switching over occurs due to any reason, a bad influence exerted upon the user can be suppressed to the minimum.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An automatic switching system comprising:

an ACT communication processing unit and a STAND-BY communication processing unit each including a transmission line selection part for selecting any one of duplexed ACT and STAND-BY transmission lines as a transmission line for transmitting information, and a communication control part for establishing a connection for a communication apparatus with respect to a requested communication through the transmission line selected by the transmission line selection part thereby to transmit information in accordance with a predetermined communication protocol; and an information transmission path for connecting the ACT communication processing unit and the STAND-BY communication processing unit, and for transmitting connection information being processed in the ACT communication processing unit to the STAND-BY communication processing unit.

2. An automatic switching system comprising:
an ACT communication processing unit and a STAND-BY communication processing unit each including a transmission line selection part for selecting any one of duplexed ACT and STAND-BY transmission lines as a transmission line for transmitting information, and a communication control part including an ATM (Asynchronous Transmission Mode) switching network and a protocol controller for establishing a connection for a communication apparatus with respect to a requested communication through the transmission line selected by the transmission line selection part thereby to transmit information in accordance with a predetermined communication protocol; and
an information transmission path for transmitting connection information being established in the ACT communication processing unit to the STAND-BY communication processing unit.

3. An automatic switching system comprising:
an ACT communication processing unit and a STAND-BY communication processing unit each including a transmission line selection part for selecting any one of duplexed ACT and STAND-BY transmission lines as a transmission line for transmitting information, and a communication control part including an ATM (Asynchronous Transmission Mode) switching network for a connection path, a call processing executing circuit for executing a predetermined processing for a requested call originated by a communication apparatus connected through the transmission line, a protocol stack having a predetermined communication protocol, a memory for storing connection path setting information and a communication interface circuit for connecting a communication control part with a communication control part in another communication processing unit; and
an information transmission path connecting each of the communication interface circuits in the communication control parts of the ACT communication processing unit and the STAND-BY communication processing unit for transmitting connection path setting information being stored in the memory of the ACT communication processing unit to the memory of the STAND-BY communication processing unit.

4. The automatic switching system according to claim 3, wherein the call processing executing circuit in the communication control part of the STAND-BY communication processing unit does not execute the processing for the requested call originated by a communication apparatus connected through the transmission line until receiving connection path setting information from the ACT communication processing unit through the information transmission path.

5. The automatic switching system according to claim 3, wherein the call processing executing circuit in the communication control part of the STAND-BY communication processing unit executes the processing for the requested call originated by a communication apparatus connected through the transmission line by using connection path setting information transmitted from the ACT communication processing unit through the information transmission path.

6. The automatic switching system according to claim 3, wherein the call processing executing circuit in the communication control part of the ACT communication processing unit transfers the connection path setting information for the requested call, originated by a communication apparatus connected through the transmission line, to the STAND-BY communication processing unit through the information transmission path when the connection path setting in the ACT communication processing unit has been completed.

7. An automatic switching system comprising:
at least two ACT communication processing units each including a transmission line selection part for selecting any one of duplexed ACT and STAND-BY transmission lines as a transmission line for transmitting information, and a communication control part for establishing a connection for a communication apparatus with respect to a requested communication through the transmission line selected by the transmission line selection part thereby to transmit information in accordance with a predetermined communication protocol;
a STAND-BY communication processing unit, connected to the at least two ACT communication processing units, including a communication control part for establishing a connection, and a selector for selecting one of transmission lines connected to the ACT communication processing units; and
an information transmission path connecting each ACT communication processing unit to the selector of the STAND-BY communication processing unit and transmitting connection information being processed in each ACT communication processing unit to the STAND-BY communication processing unit.

8. An automatic switching system comprising:
at least two ACT communication processing units each including a transmission line selection part for selecting any one of duplexed ACT and STAND-BY transmission lines as a transmission line for transmitting information, and a communication control part including an ATM (Asynchronous Transmission Mode) switching network and a protocol controller for establishing a connection for a communication apparatus with respect to a requested communication through the transmission line selected by the transmission line selection part thereby to transmit information in accordance with a predetermined communication protocol;
a STAND-BY communication processing unit, connected to the at least two ACT communication processing units, including a communication control part including an ATM (Asynchronous Transmission Mode) switching network and a protocol controller for establishing a connection, and a selector for selecting one of transmission lines connected to the ACT communication processing units; and
an information transmission path for transmitting connection information being established in each ACT communication processing unit to the STAND-BY communication processing unit.

9. The automatic switching system according to claim 8, the communication control part of the STAND-BY communication processing unit further including a plurality of memories for storing the respective connection information of each ACT communication processing unit transmitted by the information transmission path.

10. The automatic switching system according to claim 9, wherein each ACT communication processing unit transfers the connection information for the requested call, originated by a communication apparatus connected through the transmission line, to the STAND-BY communication processing unit through the information transmission path when the connection path setting in each ACT communication processing unit has been completed.

11. The automatic switching system according to claim 10, wherein the STAND-BY communication processing unit stores connection information of each ACT communication processing unit in the respective memories, and the connection information corresponding to an ACT communication processing unit to be switched over is copied to the ATM switching network when a switching over instruction is received.

* * * * *